(12) United States Patent
Lang et al.

(10) Patent No.: US 12,377,370 B2
(45) Date of Patent: Aug. 5, 2025

(54) FILTER DEVICE FOR FILTERING A FLUID

(71) Applicant: Mahle International GmbH, Stuttgart (DE)

(72) Inventors: Markus Lang, Loechgau (DE); Stefan Moedinger, Remseck a.N. (DE); Ralf Zink, Stuttgart (DE)

(73) Assignee: Mahle International GmbH (DE)

( * ) Notice: Subject to any disclaimer, the term of this patent is extended or adjusted under 35 U.S.C. 154(b) by 409 days.

(21) Appl. No.: 17/945,074

(22) Filed: Sep. 14, 2022

(65) Prior Publication Data

US 2023/0084595 A1 Mar. 16, 2023

(30) Foreign Application Priority Data

Sep. 15, 2021 (DE) .......................... 102021210213.1

(51) Int. Cl.
| | | |
|---|---|---|
| *B01D 29/07* | (2006.01) | |
| *B01D 29/52* | (2006.01) | |
| *B01D 29/56* | (2006.01) | |
| *B01D 35/147* | (2006.01) | |
| *B01D 35/30* | (2006.01) | |

(52) U.S. Cl.
CPC ............ *B01D 29/07* (2013.01); *B01D 29/52* (2013.01); *B01D 29/56* (2013.01); *B01D 35/147* (2013.01); *B01D 35/30* (2013.01)

(58) Field of Classification Search
CPC ........ B01D 29/07; B01D 29/52; B01D 29/56; B01D 35/147; B01D 35/30
USPC .............. 210/253, 117, 130, 136, 167.02, 210/172.2–172.4, 220, 254, 416.5, 439, 210/455
See application file for complete search history.

(56) References Cited

U.S. PATENT DOCUMENTS

| | | | |
|---|---|---|---|
| 7,845,500 B2 | 12/2010 | Hueppchen | |
| 2006/0180541 A1* | 8/2006 | Hueppchen | ........ B01D 35/0273 210/493.1 |
| 2017/0028324 A1* | 2/2017 | Komiyama | ............ B01D 29/58 |

FOREIGN PATENT DOCUMENTS

DE          102005004287 A1      8/2006

* cited by examiner

*Primary Examiner* — Madeline Gonzalez
(74) *Attorney, Agent, or Firm* — Fishman Stewart PLLC (57) ABSTRACT

A filter device for filtering a fluid may include a flat filter element. The flat filer element may extend flat in a longitudinal direction and a transverse direction. The filter element may include at least one pleated filter medium through which a flow path of the fluid leads in a height direction. The at least one filter medium may include a top side and a bottom side facing away from the top side. At least one strainer may be arranged on the top side. The at least one strainer may extend flat parallel to the filter medium and may include a strainer material having multiple passages such that the flow path leads through the strainer in the height direction.

20 Claims, 5 Drawing Sheets

FILTER DEVICE FOR FILTERING A FLUID

CROSS-REFERENCE TO RELATED APPLICATION

This application claims priority to German Patent Application No. DE 10 2021 210 213.1, filed on Sep. 15, 2021, the contents of which is hereby incorporated by reference in its entirety.

TECHNICAL FIELD

The present invention relates to a filter device for filtering a fluid, which comprises at least one filter medium for filtering the fluid and at least one strainer for straining the fluid.

BACKGROUND

Filter devices serve for filtering fluids, for example oil, and are employed for example in a motor vehicle. For filtering the fluid, filter devices usually comprise a filter medium which is flowed through by the fluid and thus filters the fluid. It can also be provided that the filter device comprises a strainer through which the fluid flows in order to remove particles from the fluid. Usually, filter medium and strainer have different filtering characteristics and are therefore flowed through by the fluid in a specified order.

SUMMARY

The present invention deals with the object of stating for a filter device of the type mentioned at the outset an improved or at least other embodiment which is characterised in particular by a simplified design and/or improved filtering effect.

The present invention is based on the general idea of forming a filter device with a flat filter element which comprises at least one filter medium for filtering a fluid, in particular oil, and which during the operation is linearly flowed through by the fluid to be filtered, wherein on one of the sides linearly flowed through and spaced apart from the side a strainer, further, is arranged, which extends flat parallel to the filter medium and is flowed through linearly. The filter element extending flat and the associated strainer likewise extending flat result in a compact and simple construction of the filter device. In particular, the arrangement of the flat filter element and of the strainer in the associated filter device, i.e. in an associated housing of the filter device, is possible in a simplified manner so that the assembly of the filter device is simplified. The flat extension of the filter medium and of the strainer as well as the linear flow through the strainer and the filter element further result in an enlargement of the area of the strainer and of the filter medium flowed through during the operation. This results in an increased efficiency and filtering effect of the filter device.

According to the inventive idea, the filter device comprises the filter element extending flat, which in the following is also referred to as flat filter element. The flat filter element extends flat in two directions running transversely to one another, i.e. is smaller in a third direction running transversely to the first-mentioned directions. The first-mentioned directions are also referred to as longitudinal direction and transverse direction in the following. Thus, the flat filter element extends flat in the longitudinal direction and in the transverse direction running transversely to the longitudinal direction. Further, the flat filter element comprises at least one pleated filter medium, through which a flow path of the fluid leads in a height direction running transversely to the longitudinal direction and transversely to the transverse direction. The respective filter medium thus comprises in the height direction a top side and a bottom side facing away from the top side. On the top side facing away from the bottom side of at least one of the filter media and in the height direction spaced apart from the top side, the filter medium further comprises a strainer which extends flat parallel to the filter medium, i.e. in the longitudinal direction and in the transverse direction. In contrast with the filter medium, the strainer comprises a strainer material which for straining the fluid comprises multiple passages open in the height direction. As a consequence, the flow path in the height direction leads through the respective at least one strainer.

The flat extension of the flat filter element practically results in that in a plane split open by the longitudinal direction and transverse direction the flat filter element is formed plate-like. The same applies to the at least one strainer, which in a plane defined by the longitudinal direction and transverse direction extends flat and plate-like.

The filter device can be employed for filtering any fluids. In particular, the filter device is employed for filtering a liquid, in particular oil. Thus, the filter device is in particular an oil filter device.

Basically, the filter device can be employed in any applications. In particular, the filter device is employed in a motor vehicle in order to filter a corresponding fluid, in particular oil, during the operation of the motor vehicle.

Preferred are embodiments, in which the filter device comprises at least one bypass spaced apart from the at least one filter media transversely to the height direction. Thus, the filter device comprises for example at least one bypass spaced apart from the at least one filter media in the longitudinal direction. Preferably, the bypass belongs to the filter medium spaced apart in the longitudinal direction. This means that the bypass allows bypassing the associated filter medium. Advantageously, the at least one bypass is open in the height direction so that the flow path in the height direction leads through the bypass. This allows a more flexible operation of the filter device with simpler assembly and production at the same time.

Embodiments are considered advantageous, in which the flat filter element comprises a frame in which the at least one filter medium is received. Practically, the frame including at least a filter medium extends flat in the longitudinal direction and transverse direction. The frame makes possible a simplified handling during the assembly of the filter device and can, further, delimit the filter media in the longitudinal direction and/or in the transverse direction and thus prevent or at least reduce a flow of the fluid through the at least one filter medium in the longitudinal direction and/or in the transverse direction.

Preferred are embodiments, in which at least one of the at least one bypasses is formed in the frame. The result is a simple and compact design of the filter device, wherein at the same time defined flows of the fluid through the filter device are realised in a simplified manner.

Preferred are embodiments, in which the at least one strainer is supported on the frame. This results in a defined positioning of the at least one strainer in the filter device and relative to the at least one filter medium.

Advantageously, a bypass valve is arranged in the at least one of the at least one bypasses, preferably in the respective bypass, which bypass valve optionally opens and blocks a flow of the fluid through the bypass.

Preferably, at least one of the at least one bypass valves comprises a valve body which in the associated bypass is adjustable in the height direction and spring-loaded with a spring force in the height direction, so that the valve body closes the bypass by means of the spring force. When the fluid counteracts the spring force and overcomes the same, the valve body is moved and thus opens the bypass. This means that with a pressure counteracting the spring force and acting on the valve body by means of the fluid, the bypass is opened when the pressure overcomes the spring force. It is thus possible to open and close the bypass in a simple manner by means of the pressure present in the fluid. As a consequence, different branches of the flow paths can be flowed through in the filter device dependent on the pressure in the fluid, in order to filter the fluid in a desired and adequate manner.

Basically, the flat filter element can merely comprise a single pleated filter medium.

Preferred are embodiments, in which the flat filter element comprises two filter media, which in the following are also referred to as first filter medium and second filter medium. The filter media can be identical in size, in particular formed identically. The filter media can also be formed differently in size. This makes possible a more variable flow through the filter device and thus a filtering of the fluid adapted to the respective requirement.

Thus, the flat filter element advantageously comprises a first filter medium and a second filter medium spaced apart from the first filter medium transversely to the height direction, for example in the transverse direction that is separated from the first filter medium, through which the flow path leads separately and in the height direction. The first filter medium can be larger than the second filter medium. In particular, the filter medium is larger in the transverse direction than the second filter medium. During the operation, the first filter medium can serve as a main filter medium, whereas the second filter medium can serve as a secondary filter medium. The second filter medium can be employed in particular when the pressure loss in the flow through the first filter medium is too high, i.e. exceeds a specified limit. This can be the case in particular when the fluid, for example at low temperatures, has an increased viscosity. Alternatively or additionally, the pressure loss can exceed the limit when the first filter medium is dirty and thus does not make possible an adequate filtering of the volumetric flow of the fluid through the filter device. Here it is possible in particular to realise an additional flow through the second filter medium by means of the at least one bypass and/or bypass valve.

Preferred are embodiments, in which for the respective filter medium an associated strainer is provided. This means that the filter device for the first filter medium comprises a first strainer and for the second filter medium a second strainer, wherein the first strainer analogously to the first filter medium can be larger in the transverse direction than the second strainer. The respective filter medium and the associated strainer thus form a group which when required can be flowed through for filtering the fluid. The first strainer serves in particular as main strainer, while the second strainer serves in particular as secondary strainer. This allows an individual flow through the filter device with simple realisation at the same time. In particular, a respective associated delivery device for delivering the fluid through the associated group can be provided for at least two of the groups.

Advantageous, further, are embodiments, in which for the respective filter medium an associated bypass, advantageously including associated bypass valve, is provided. This means that the filter device, spaced apart from the first filter medium in the longitudinal direction, comprises a first bypass and spaced apart from the second filter medium in the longitudinal direction, a second bypass. Here, the bypasses are advantageously arranged aligned with one another in the transverse direction.

The housing of the filter device preferably comprises a housing upper part and a housing lower part, which in the height direction are arranged located opposite one another and extend flat preferably in the longitudinal direction and in the transverse direction. The housing upper part and the housing lower part delimit a volume in which the flat filter element and the at least one strainer, advantageously, further, the at least one bypass and the at least one bypass valve are received.

Preferably, the housing lower part serves as a pan, in which during the operation the fluid, in particular oil, can be collected and drained when required. The pan is thus in particular an oil pan, so that the housing lower part can be an oil pan. For draining the fluid, in particular the oil, from the pan, the pan advantageously comprises a drain opening which can be opened and closed, for example by means of a drain plug.

Preferred are embodiments, in which on the side of the housing upper part facing away from the volume in the height direction at least one connector is formed, which is fluidically connected with the volume and through which the flow path leads. The respective at least one connector thus serves for the purpose of admitting the fluid to be filtered into the filter device and/or conducting the same out of the filter device. In particular, the respective at least one connector serves for draining the fluid out of the filter device and thus as drain.

Preferred are embodiments, in which at least one of the at least one connectors is inserted into an associated one of the at least one bypasses so that the flow path in the height direction leads through the connector and the bypass. This results in a compact construction of the filter device, wherein at the same time defined branches of the flow path are realised in the filter device.

It is preferred when the housing upper part comprises an associated such connector for the respective at least one bypass. Advantageous are thus embodiments, in which the filter device for the first bypass comprises a first connector, which is inserted into the first bypass, and for the second bypass comprises a second connector, which is inserted into the second bypass. Here, the connectors are practically spaced apart from one another in the transverse direction corresponding to the spaced-apart arrangement of the bypasses.

An advantageous design of the filter device is achieved in that, when at least one of the at least one connectors is passed through a recess of an associated one of the at least one strainers. This means that at least one of the at least one strainers comprises a recess through which the connector leads and is inserted into the associated bypass. This results in a defined flow through the filter device and a defined positioning of the strainer in the filter device.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

A preferred exemplary embodiment of the invention is shown in the drawings and is explained in more detail in the following description, wherein same reference numbers relate to same or similar or functionally same components.

BRIEF DESCRIPTION OF THE DRAWINGS

It shows, in each case schematically.

DETAILED DESCRIPTION

A filter device 1, as is exemplarily shown in the FIGS. 1 to 5, serves for filtering a fluid, in particular oil. For this purpose, the filter device 1 comprises a flat filter element 2, which extends flat in a longitudinal direction 3 and a transverse direction 4 running transversely to the longitudinal direction. This means that the flat filter element is larger in the longitudinal direction 3 and in the transverse direction 4 than in a height direction 5 running transversely to the longitudinal direction 3 and transversely to the transverse direction 4. For filtering the fluid, the flat filter element 2 comprises at least one filter medium 6 which during the operation is flowed through in the height direction 5 in order to filter the fluid. This means that the at least one filter medium 6 is flowed through in the height direction 5. The filter medium 6 is a pleated filter medium 6 which in the shown exemplary embodiment is received in a frame 7 of the flat filter element 2. The at least one filter medium 6 has in the height direction 5 a top side 8 and a bottom side 9 facing away from the top side 8. On the side of the top side 8 of the filter medium 6 facing away from the bottom side 9 and spaced apart from the filter medium 6 in the height direction 5, the filter device 1 further comprises a strainer 10. The strainer 10 extends flat parallel to the filter medium 6. During the operation, the strainer 10 is flowed through by the fluid in the height direction 5. Thus, a flow path 11 (see FIG. 5) of the fluid leads through the medium 6 and through the strainer 10 in the height direction 5. The strainer 10 comprises a strainer material 12 which comprises multiple passages that are open in the height direction and are not shown further in the figures, so that the flow path 11 leads through the strainer 10 in the height direction 5. In the shown exemplary embodiment, the strainer material 12 is received in a frame 13 which in the following for better distinction from the frame 7 of the flat filter element 2 is also referred to as enclosure 13. In the shown exemplary embodiment, the at least one strainer 10 is supported on the frame 7 by means of the enclosure 13. Here, the respective at least one strainer 10 is enclosed by the frame 7 transversely to the height direction 5.

In the shown exemplary embodiment, the flat filter element 2 comprises two filter media 6 which are spaced apart from one another in the transverse direction 4. Thus, the flat filter element 2 comprises a first filter medium 6a and a second filter medium 6b that is spaced apart from the first filter medium 6a in the transverse direction, through which the flow paths 11 lead separately. Further, the filter device 1 comprises an associated strainer 10 for the respective filter medium 6. This means that the filter device 1 comprises a first strainer 10a for the first filter medium 6a and a second strainer 10b for the second filter medium 6b. The respective filter medium 6 and the associated strainer 10 thus form a group through which the flow path 11 leads separately. Here, the first filter medium 6a in the shown exemplary embodiment is larger than the second filter medium 6b. In the shown exemplary embodiment, the first filter medium 6a is larger in the transverse direction 4 than the second filter medium 6b. The first strainer 10a, corresponding to the filter media 6, is larger in the transverse direction 4 than the second strainer 10b.

In the shown exemplary embodiment, the filter device 1, spaced apart from the at least one filter medium 6 in the longitudinal direction, comprises a bypass 14. In the shown exemplary embodiment, the filter device 1, spaced apart from the respective filter medium 6 in the longitudinal direction 3, comprises an associated bypass 14. This means that the filter device 1 comprises a bypass 14 that is spaced apart from the first filter medium 6a in the longitudinal direction 3 and a second bypass 14b that is spaced apart from the second filter medium 6b in the longitudinal direction 3. Here, the bypasses 14 are aligned with one another in the transverse direction 4. The respective bypass 14 is open in the height direction 5 and can thus be flowed through in the height direction 5. This means that the flow path 11 in the height direction 5 leads through the respective bypass 14. In the shown exemplary embodiment, the bypasses 14 are formed in the frame 7 of the flat filter element 2. For opening and blocking the flow through the respective bypass 14, the filter device 1, as is evident in particular from FIG. 2, comprises for the respective bypass 14 an associated bypass valve 15.

The respective bypass valve 15 is arranged in the associated bypass 14. Thus, the filter device 1 comprises a first bypass valve 15a, which is arranged in the first bypass 14a. In addition, the filter device 1 comprises a second bypass valve 15b, which is arranged in the second bypass 14b. The respective bypass valve 15 comprises a valve body 16 which is adjustably arranged in the height direction in the associated bypass 14. Here, the valve body 16 is spring-loaded in the height direction 5 with a spring force which in the shown exemplary embodiment is exerted by a spring 17. Thus, the bypass 14 is closed with the valve body 16. When the fluid exerts a pressure directed against the spring force on the valve body 16, the valve body 16 is moved in the height direction 5, when the pressure exceeds the spring force, and the bypass 14 is thus open.

Further, the filter device 1 comprises a housing 18 which comprises a housing upper part 19 and a housing lower part 20. Housing upper part 19 and housing lower part 20 are arranged located opposite one another in the height direction 5 and extend flat transversely to the height direction 5. Housing upper part 19 and housing lower part 20 delimit a volume 21 in which the flat filter element 2, the strainers 10, the bypasses 14 and the bypass valves 15 are received. For sealing the volume 20 transversely to the height direction 5, a circumferential seal 31 is provided between the housing upper part 19 and the housing lower part 20 in the shown exemplary embodiment, as is evident from FIG. 1. The seal 31 follows the shape of the housing 18 and is thus formed as a shaped seal 32. As is evident from FIG. 1, the housing lower part 20 and the housing upper part 19 can be connected to one another by means of screw connections which are not shown further, wherein the screw connections can comprise sleeves 22 spaced apart from one another outside along the housing 18. In the shown exemplary embodiment, the housing lower part 20 serves as a pan 23 for collecting the fluid, in particular the oil. In order to be able to drain the fluid from the pan 23, the pan 23 further comprises a drain opening 24 which can be closed and opened by means of a drain plug 25.

On the side of the housing upper part 19 facing away from the volume 21 in the height direction 5, at least one connector 26 is further formed which is fluidically connected with the volume 21. The at least one connector 26 in the shown exemplary embodiment serves for admitting/or discharging the fluid from the volume 21 and thus as outlet. Consequently, the flow path 11 leads through the connector 26 in the height direction 5. In the shown exemplary embodiment, the housing upper part 19 comprises for the respective bypass 14 an associated connector 26 which in the height direction 5 is inserted into the associated bypass 14, as is evident in particular from the FIGS. 4 and 5. Thus, the housing upper part 19 comprises a first connector 26a which is inserted into the first bypass 14a. In addition, the housing upper part 19 comprises a second connector 26b, which is inserted into the second bypass 14b. As is evident in particular from FIG. 1, the filter device 1 in the shown exemplary embodiment comprises for the respective filter medium 6 and thus for the respective group an associated inlet 33 for letting the fluid into the volume 21. In the shown exemplary embodiment, the respective inlet 33 is recessed in the longitudinal direction 3 on the front end of the housing upper part 19. Thus, the filter device 1 comprises a first inlet 33 for the first filter medium 6a and the first strainer 10a and a second inlet 33b for the second filter medium 6b and the second strainer 10b. Thus, the filter device 1 comprises an associated inlet for the respective outlet formed as connector 26.

It is conceivable to provide in an associated application, for example in a motor vehicle that is not shown, for the respective group an associated delivery device (not shown), for example a suction pump connected to the associated connector 26.

The respective bypass valve 15, further, comprises a ring seal 27, which in the height direction 5 is arranged between the spring 17 and the associated connector 26. As is further evident from FIG. 1, a magnet 34 can be arranged in the volume 21. Using the magnet 34, metallic particles can be pre-separated from the fluid before they leave the volume 21 via the respective outlet, in the shown exemplary embodiment thus via the respective bypass 14 and connector 26.

Figure 1:
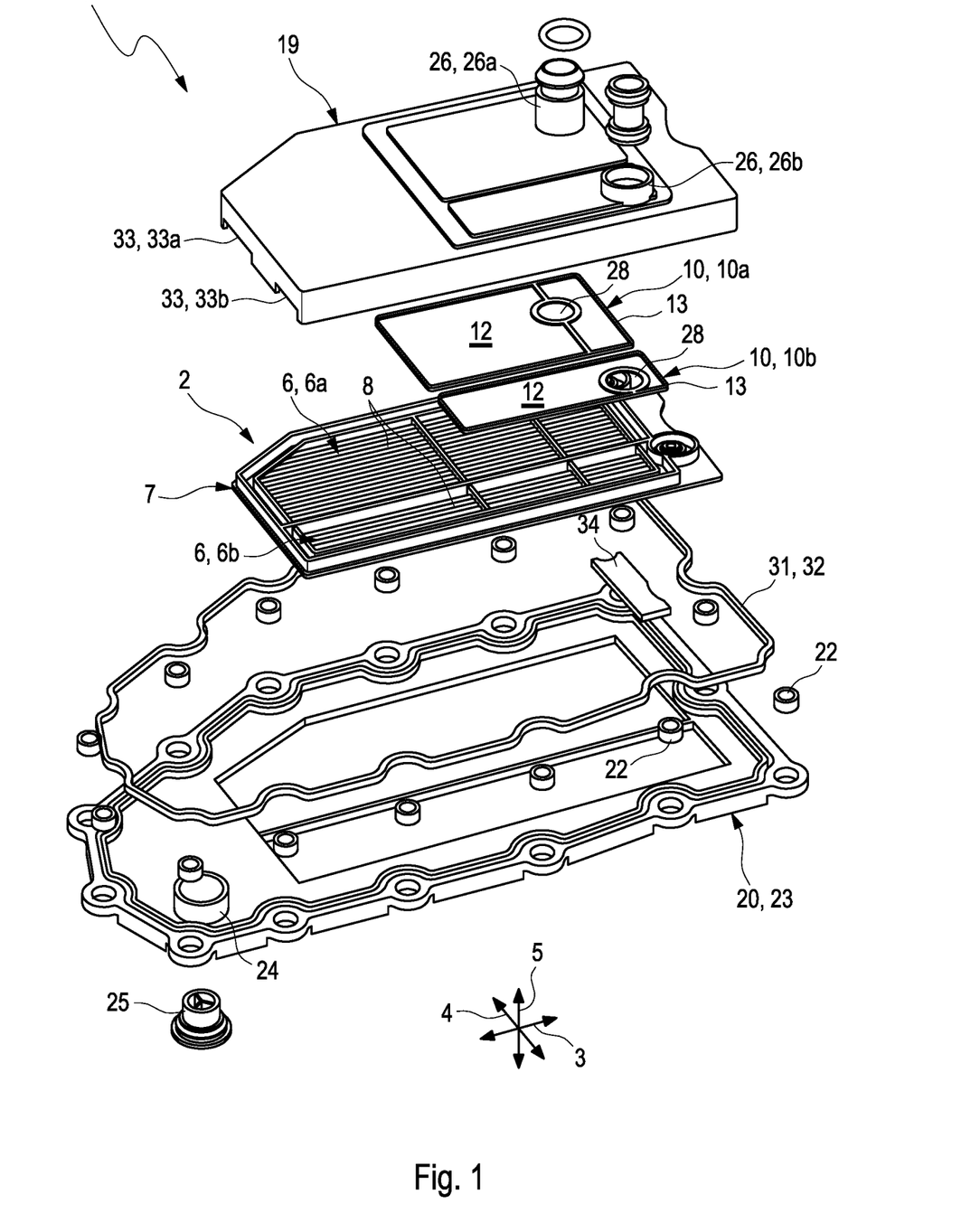
FIG. 1 shows an isometric exploded representation of a filter device.
Figure 2:
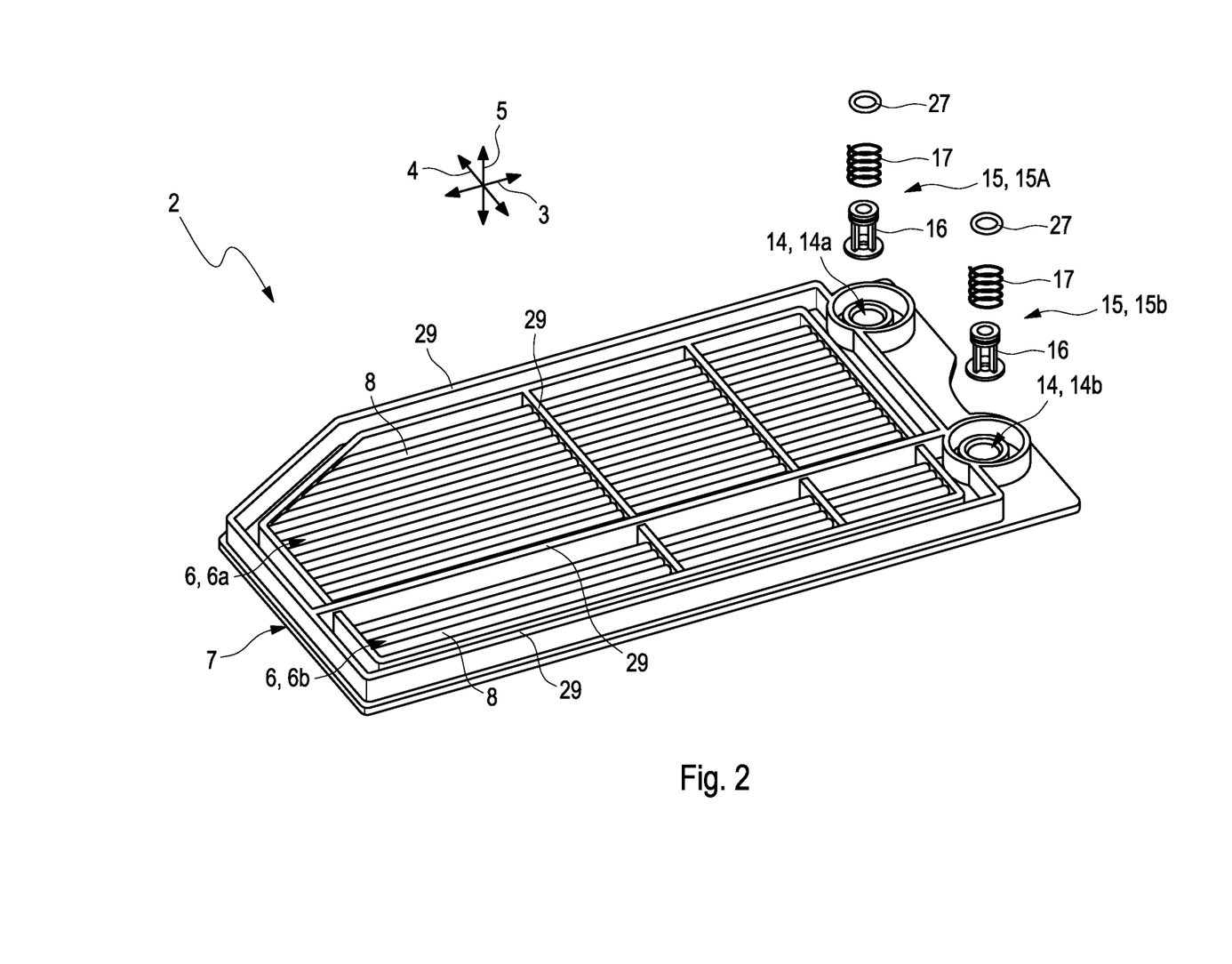
FIG. 2 shows an isometric view of a flat filter element of the filter device.
Figure 3:
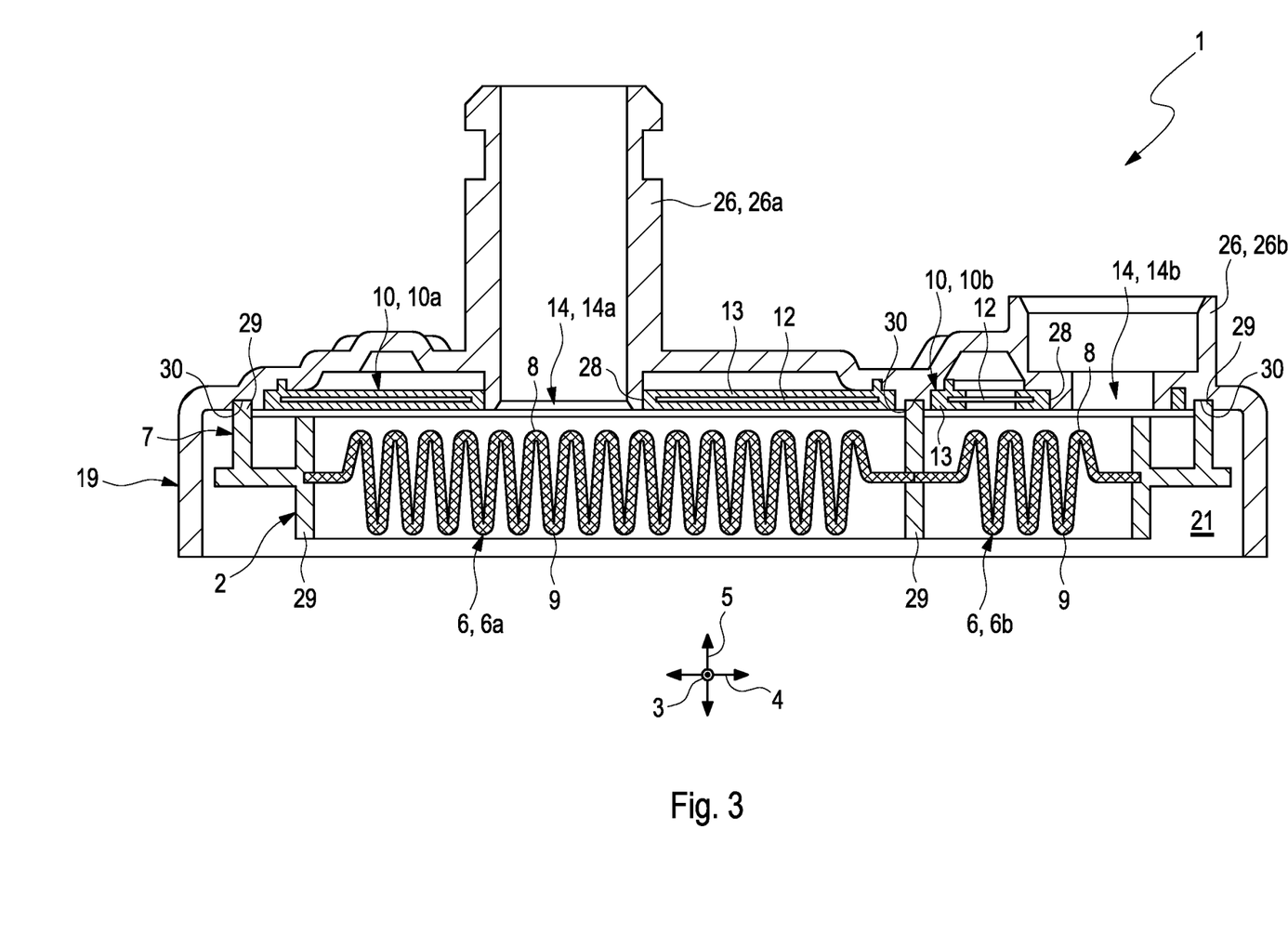
FIG. 3 to FIG. 5 show different sections each through the filter device.
Figure 4:
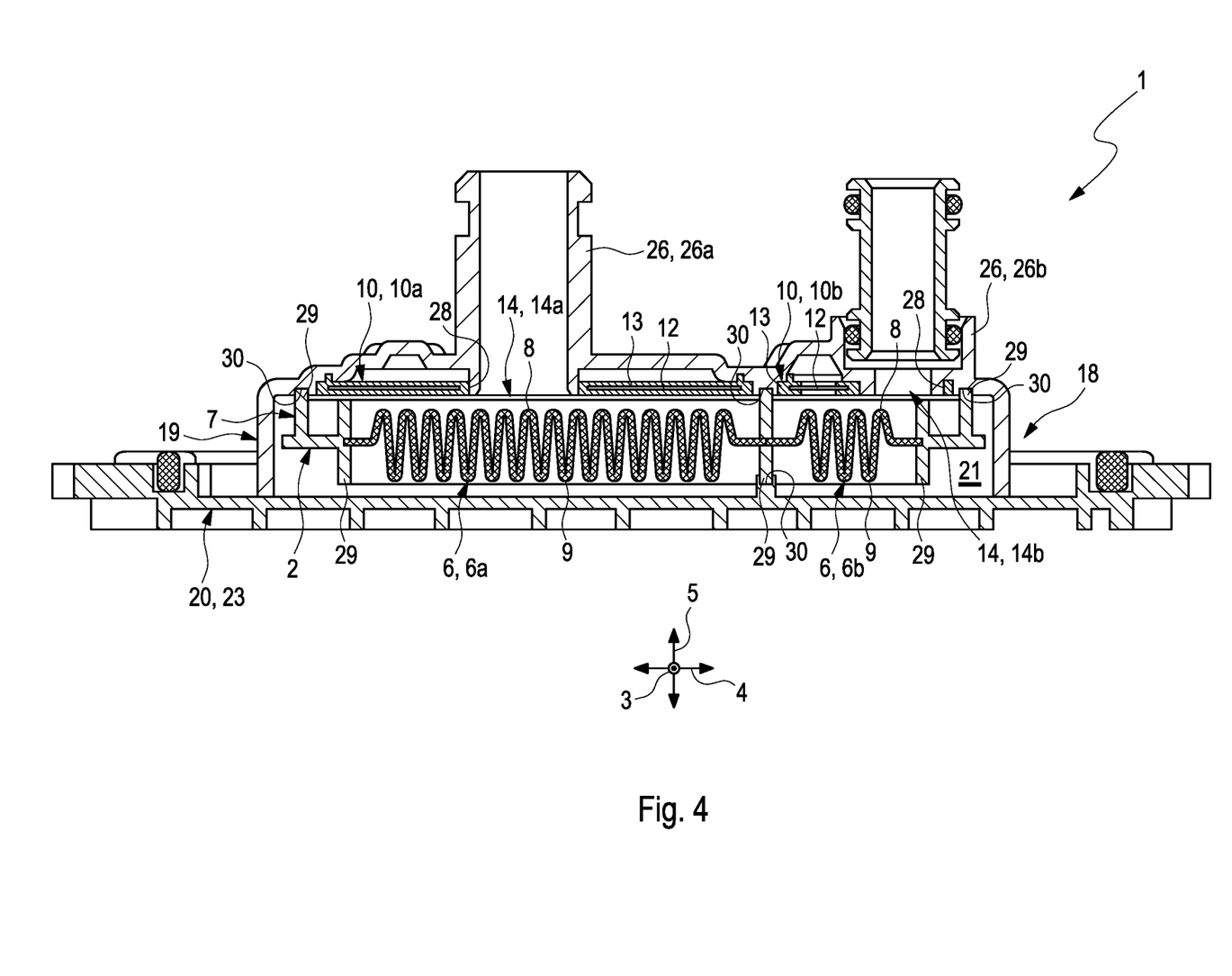

As is evident in particular from the FIGS. 3 and 4, the respective connector 26 runs through an associated one of the strainers 10 in the height direction 5. This means that the first connector 26a in the height direction 5 is routed through the first strainer 10a and the second connector 26b in the height direction 5 through the second strainer 10b. For this purpose, the respective strainer 10 comprises a recess 28 for the associated connector 26. In the shown exemplary embodiment, the respective recess 28 is formed in the enclosure 13 of the associated strainer 10, as is evident in particular from FIG. 1. With the filter device 1, different branches of the flow path 11 can be realised as is evident from FIG. 5. By means of the bypasses 14 it is possible in particular to conduct the fluid through the respective filter medium 6 and the associated strainer 10. Further, the filter device 1 is designed compact and simple.

As is evident in particular from FIG. 3, the strainers 10 are each pressed into the housing upper part 19 by means of the enclosure 13, in the shown exemplary embodiment, further, into the associated connector 26 in the height direction 5.

Figure 5:
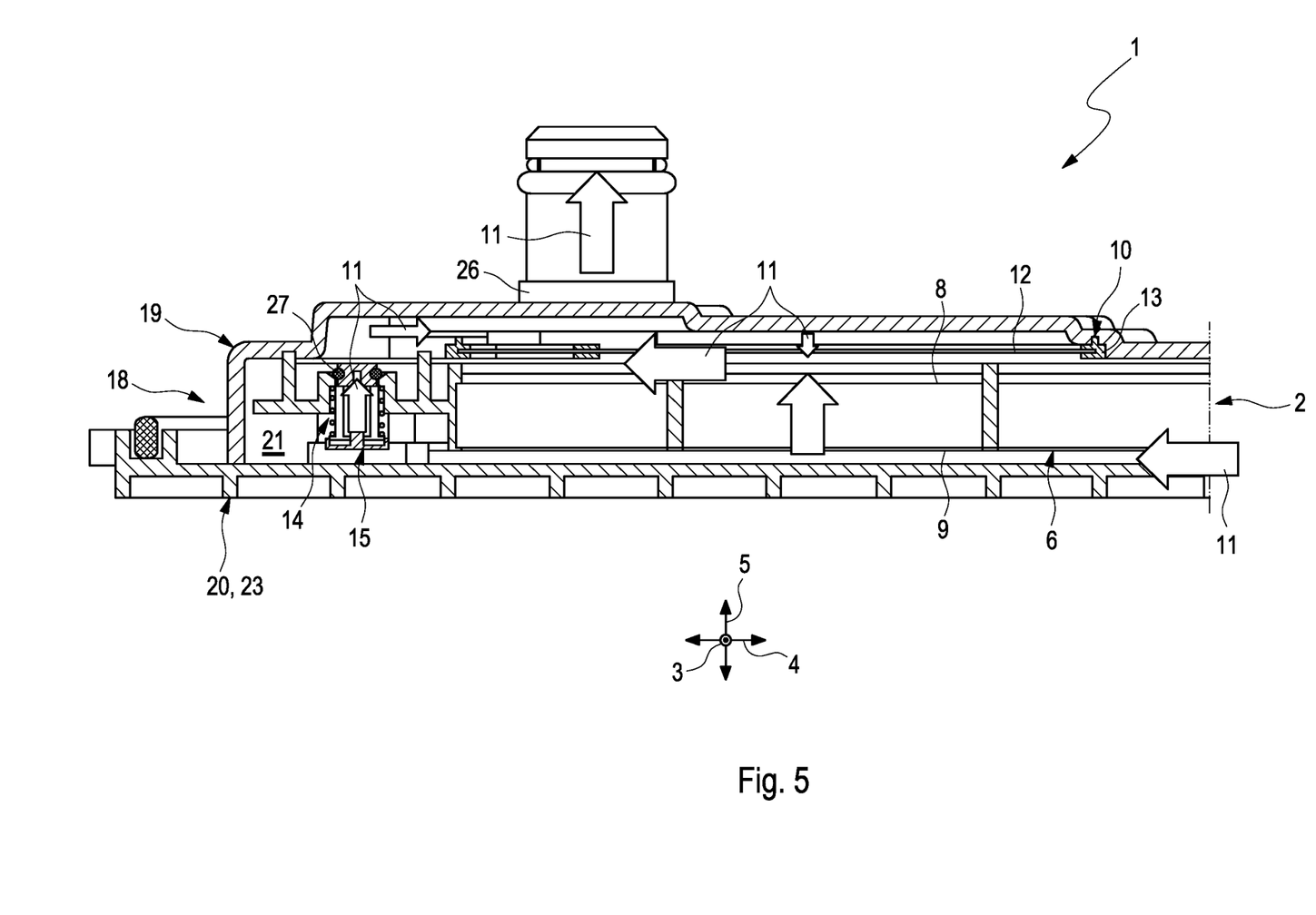

As is evident in particular from FIG. 5, the flat filter element 2 is fixed on the housing 18 by means of the frame 7. For this purpose, as is evident from FIG. 5, shoulders 29 of the frame 7 projecting in the height direction 5 engage in associated receptacles 30 of the housing upper part 19 and the housing lower part 20. Here, the shoulders 29 in the receptacles 30 can be welded to the housing upper part 19 and the housing lower part 20.

The invention claimed is:

1. A filter device for filtering a fluid, comprising:
a flat filter element extending flat in a longitudinal direction and a transverse direction running transversely to the longitudinal direction, the filter element including at least one pleated filter medium through which a flow path of the fluid leads in a height direction running transversely to the longitudinal direction and transversely to the transverse direction;
wherein the at least one filter medium, in the height direction, includes a top side and a bottom side facing away from the top side;
at least one strainer arranged on the top side, the at least one strainer extends flat parallel to the filter medium and includes a strainer material having multiple passages opened in the height direction such that the flow path leads through the strainer in the height direction;
wherein the filter device includes at least one bypass spaced apart from the at least one filter medium in the longitudinal direction and through which the flow path leads in the height direction;
wherein the flat filter element includes a frame that receives the at least one filter medium; and
the at least one bypass is formed in the frame.

2. The filter device according to claim 1, wherein a bypass valve is arranged in the at least one bypass.

3. The filter device according to claim 2, wherein the bypass valve includes a valve body, and wherein the bypass is spring-loaded with a spring force in the height direction such that the valve body closes the bypass and opens the bypass with a pressure counteracting the spring force via the fluid on the valve body.

4. The filter device according to claim 1,
wherein the flat filter element includes a first filter medium and a second filter medium that is spaced apart from the first filter medium in the transverse direction and is separate from the first filter medium, the flow path leads separately through the second filter medium.

5. The filter device according to claim 4,
wherein the at least one strainer includes a first strainer for the first filter medium and a second strainer for the second filter medium.

6. The filter device according to claim 5,
wherein the at least one bypass includes a first bypass spaced apart from the first filter medium in the longitudinal direction and a second bypass spaced apart from the second filter medium in the longitudinal direction;
the first bypass and the second bypass are aligned with one another in the transverse direction.

7. The filter device according to claim 1,
wherein the filter device includes a housing upper part and a housing lower part located opposite the housing upper part in the height direction, the housing upper part and the housing lower part delimit a volume in which the flat filter element and the at least one strainer are received;
at least one connector is formed on a side of the housing upper part facing away from the volume in the height direction, the at least one connector is fluidically connected with the volume and through which the flow path leads.

8. The filter device according to claim 7, wherein the at least one connector is inserted into the at least one bypass such that the flow path in the height direction leads through the connector and the bypass.

9. The filter device according to claim 8, wherein the at least one strainer includes a recess through which the connector leads and is inserted into the bypass.

10. A filter device, comprising:
a filter element including at least one pleated filter medium;
wherein the at least one filter medium includes a top side and a bottom side;
at least one strainer arranged on the side of the top side, the at least one strainer extends parallel to the filter medium and includes a strainer material having multiple passages;
wherein the filter device includes at least one bypass spaced apart from the at least one filter medium; and
wherein the filter element includes a frame that receives the at least one filter medium, and the at least one bypass is formed in the frame.

11. The filter device according to claim 10, wherein a bypass valve is arranged in the at least one bypass.

12. The filter device according to claim 11, wherein the bypass valve includes a valve body, and wherein the bypass is spring-loaded with a spring force.

13. The filter device according to claim 10, wherein the filter element includes a first filter medium and a second filter medium that is spaced apart from the first filter medium.

14. The filter device according to claim 13, wherein the at least one strainer includes a first strainer for the first filter medium and a second strainer for the second filter medium.

15. The filter device according to claim 14, wherein the at least one bypass includes a first bypass spaced apart from the first filter medium and a second bypass spaced apart from the second filter medium.

16. The filter device according to claim 10, wherein the filter device includes a housing upper part and a housing lower part located opposite the housing upper part.

17. A filter device for filtering a fluid, comprising:
a flat filter element extending flat in a longitudinal direction and a transverse direction running transversely to the longitudinal direction, the filter element including at least one pleated filter medium through which a flow path of the fluid leads in a height direction running transversely to the longitudinal direction and transversely to the transverse direction;
wherein the at least one filter medium, in the height direction, includes a top side and a bottom side facing away from the top side;
at least one strainer arranged on the top side, the at least one strainer extends flat parallel to the filter medium and includes a strainer material having multiple passages opened in the height direction such that the flow path leads through the strainer in the height direction;
wherein the filter device includes at least one bypass spaced apart from the at least one filter medium in the longitudinal direction and through which the flow path leads in the height direction;
wherein the filter device further includes a housing upper part and a housing lower part located opposite the housing upper part in the height direction, the housing upper part and the housing lower part delimit a volume in which the flat filter element and the at least one strainer are received;
at least one connector disposed on a side of the housing upper part facing away from the volume in the height direction, the at least one connector is fluidically connected with the volume and through which the flow path leads; and
wherein the at least one connector is inserted into the at least one bypass such that the flow path in the height direction leads through the connector and the bypass.

18. The filter device according to claim 17, wherein the at least one strainer includes a recess through which the connector leads and is inserted into the bypass.

19. The filter device according to claim 17, wherein the flat filter element includes a frame that receives the at least one filter medium.

20. The filter device according to claim 17, wherein a bypass valve is arranged in the at least one bypass.

* * * * *